(12) United States Patent
Kobayashi et al.

(10) Patent No.: US 7,217,930 B2
(45) Date of Patent: May 15, 2007

(54) DOSE DETECTOR AND DOSIMETER

(75) Inventors: Hironobu Kobayashi, Tokyo (JP); Kei Aoyama, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 208 days.

(21) Appl. No.: 11/107,859

(22) Filed: Apr. 18, 2005

(65) Prior Publication Data

US 2005/0247881 A1    Nov. 10, 2005

(30) Foreign Application Priority Data

May 7, 2004    (JP)    ............... 2004-138828

(51) Int. Cl.
*G01T 1/02*    (2006.01)
*G01T 1/24*    (2006.01)

(52) U.S. Cl. ............................... 250/370.07

(58) Field of Classification Search ........... 250/370.08, 250/484.5, 369
See application file for complete search history.

(56) References Cited

U.S. PATENT DOCUMENTS

| 4,445,036 | A | * | 4/1984 | Selph | ............... | 250/370.05 |
|---|---|---|---|---|---|---|
| 4,527,063 | A | * | 7/1985 | Kronenberg et al. | ... | 250/370.06 |
| 4,751,390 | A | * | 6/1988 | Kopp | ............... | 250/370.06 |
| 4,973,913 | A | * | 11/1990 | Oda | ............... | 327/70 |
| 5,406,086 | A | * | 4/1995 | Barthe et al. | ......... | 250/390.03 |
| 6,300,635 | B1 | * | 10/2001 | Brambilla et al. | ..... | 250/370.07 |
| 2004/0129888 | A1 | * | 7/2004 | Kannan et al. | ........ | 250/370.07 |

FOREIGN PATENT DOCUMENTS

| JP | S59-046573 | | 3/1984 |
|---|---|---|---|
| JP | S62-245983 | | 10/1987 |
| JP | 03017588 | A * | 1/1991 |
| JP | 09/033660 | | 2/1997 |

* cited by examiner

*Primary Examiner*—Albert Gagliardi
(74) *Attorney, Agent, or Firm*—Manabu Kanesaka

(57) ABSTRACT

A dose detector includes a semiconductor radiation detector; a dose counter; and a check counter. The dose detector detects that the semiconductor radiation detector is outputting white noise even in a radiation shielded area and judges that the semiconductor radiation detector is working in a normal manner when dose count data from the dose counter is smaller than predetermined dose boundary data and check count data from the check counter is greater than predetermined lower limit checking data. The dose detector and a dosimeter provided with the dose detector are simple in structure and capable of checking a status of the semiconductor radiation detector safely.

11 Claims, 9 Drawing Sheets

DOSE DETECTOR AND DOSIMETER

BACKGROUND OF THE INVENTION AND RELATED ART STATEMENT

The present invention relates to a dose detector having a function of checking a semiconductor radiation detector for measuring a radiation; dose in a radioactive isotope handling facility such as a nuclear facility and a laboratory, and in a natural environment. The present invention also relates to a dosimeter provided with the dose detector.

A dosimeter measures and, displays radiation doses (an exposure dose or a dose) in real time to find that a nuclear personnel is exposed during work, and generates an alarm when the exposure dose exceeds a predetermined limit, thereby preventing the nuclear personnel form being overexposed to radiation. The nuclear personnel always carries the dosimeter while working in a radiation controlled area, and often carries the dosimeter in a pocket of a work clothe.

In an environment in which the dosimeter is used, there are low level radiations other than the radiation to be measured. The low level radiations include naturally existing radiations, low level radiations from a radioactive material on the earth, in-vivo radioactivity, and cosmic rays. The nuclear radiations other than the nuclear radiations to be measured are referred to as background. The dosimeter detects the unnecessary background, and the background is generally removed as a noise before detecting the nuclear radiations to be measured. In the specification, an output of the semiconductor radiation detector based on the background will be referred to as background noise.

A conventional dosimeter has a noise removal function for removing the background noise. The noise removal function for removing the background noise will be explained with reference to FIG. 15. FIG. 15 is a block circuit diagram showing a conventional dose detector mounted in the conventional dosimeter. The conventional dose detector shown in FIG. 15 has the noise removal function.

As shown in FIG. 15, a dose detector 100 includes a semiconductor radiation detector 101, an amplifier 102, a pulse height discriminator 103, and a counter 104. The dose detector 100 also includes a central processing unit (CPU; not shown) and a unit for processing data (not shown). The semiconductor radiation detector 101 outputs a detection signal according to detected nuclear radiations. The amplifier 102 amplifies the detection signal with a predetermined gain to adjust an amplitude voltage (wave height) of the detection signal appropriately.

The pulse height discriminator 103 is a discriminator circuit for inputting a reference detection wave height voltage (a reference detection voltage) determined by voltage dividing resistors 103a and 103b to a comparator circuit 103c, and discriminates a signal with a wave height voltage higher than the reference detection voltage from the detection signal, so that the discriminated signal is output as a pulse signal. Through the discrimination according to the wave height, it is possible to remove the background noise below the reference detection voltage. The counter 104 counts the pulse signal after the background noise is removed, thereby counting the radiation dose.

In the dose detector 100, when the pulse height discriminator 103 is not provided, the counter 104 may output a large number of count values including the background noise below the reference detection voltage, as shown as a count value to wave height voltage characteristic in FIG. 16. When the pulse height discriminator 103 discriminates the detection signal according to the wave height, the signal with a voltage above the reference detection voltage is output as the pulse signal, and the background noise below the reference detection voltage is removed as an object not to be detected, thereby detecting only the dose of the nuclear radiations to be detected.

Such a conventional device has been disclosed in Patent Document 1. Patent Document 2 has disclosed a structure in which a semiconductor radiation detector has a self-check function.

Patent Document 1; Japanese Patent Publication (Kokai) No. 09-33660

Patent Document 2; Japanese Patent Publication (Kokai) No. 59-46573

In the conventional dosimeter having the dose detector 100, it is checked whether the dose-detector 100 is working properly at specific intervals. For example, in the dosimeter shown in FIG. 15 or a beta- or β-ray dose measuring instrument disclosed in Patent Document 1, the dose detector is exposed to a detector calibration radiation source (a checking source) 200 with a specified distance in between. After the dose detector is exposed to a predetermined irradiation dose of radiation from the checking source 200 for a predetermined period of time, when a count value is a predetermined value, the dose detector is judged to be normal. When the count value is smaller than the predetermined value (0 or close to 0) or too large, the dose detector is judged to be abnormal.

It is necessary to carefully handle the checking source 200 due to radioactive isotope, thereby making is difficult to check the dosimeter safely. Also, it is troublesome to handle the checking source 200 due to history management, a strict facility for storing the radioactive isotope and access record management. It is necessary to interrupt use of the dosimeter for checking whether the dosimeter is functioning, thereby taking long time.

The semiconductor radiation detector disclosed in Patent Document 2 is capable of self-checking. A light emitting device irradiates the semiconductor radiation detector to check an operation thereof, thereby making it possible to check the detector without the checking source 200. However, it is necessary to provide the light emitting device, a driver circuit for driving the light emitting device, and a judging unit in the semiconductor radiation detector, thereby limiting a design of the semiconductor radiation detector. It has been desired to obtain a checking function with a simple structure based on a different concept.

In view of the problems described above, an object of the present invention is to provide a dose detector in which it is possible to safely check the dose detector with a simple structure.

Another object of the present invention is to provide a dosimeter provided with the dose detector.

Further objects and advantages of the invention will be apparent from the following description of the invention.

SUMMARY OF THE INVENTION

In order to attain the objects described above, according to a first aspect of the invention, a dose detector includes a semiconductor radiation detector for outputting a detection signal according to detected nuclear radiations; a first pulse height discriminator for discriminating a signal with a voltage greater than a predetermined reference detection wave height voltage from the detection signal from the semiconductor radiation detector to remove noise in the detection signal, and outputting a first pulse signal after the noise is removed; a dose counter for counting the first pulse signal from the first pulse height discriminator to output dose count data; a second pulse height discriminator for discriminating a signal with a voltage greater than a predetermined reference checking wave height voltage from the detection signal from the semiconductor radiation detector, and outputting a second pulse signal including a part of the noise; a check counter for counting the second pulse signal from the second pulse height discriminator to output check count data; and a data processor for receiving the dose count data from the dose counter and the check count data from the check counter. The data processor includes a judging unit for judging that the semiconductor radiation detector is normal when the dose count data is smaller than predetermined dose boundary data and the check count data is larger than predetermined lower limit checking data.

According to a second aspect of the present invention, in the dose detector of the first aspect, the noise is white noise caused by the semiconductor radiation detector in a radiation shielded area. The data processor includes a unit for judging that the semiconductor radiation detector is normal because of outputting the white noise in the radiation shielded area when the dose count data is smaller than the predetermined dose boundary data and the check count data is larger than the lower limit checking data.

According to a third aspect of the invention, a dose detector includes a semiconductor radiation detector for outputting a detection signal according to detected nuclear radiations; a first pulse height discriminator for discriminating a signal with a voltage greater than a predetermined reference detection wave height voltage from the detection signal from the semiconductor radiation detector to remove noise contained in the detection signal, and outputting a first pulse signal after the noise is removed; a dose counter for counting the first pulse signal from the first pulse height discriminator to output dose count data; a second pulse height discriminator for discriminating a signal with a voltage greater than a predetermined reference checking wave height voltage from the detection signal from the semiconductor radiation detector, and outputting a second pulse signal including a part of the noise; a check counter for counting the second pulse signal from the second pulse height discriminator to output check count data; and a data processor for receiving the dose count data from the dose counter and the check count data from the check counter. The data processor includes a subtracting unit for subtracting the dose count data from the check count data to obtain difference data and a judging unit for judging that the semiconductor radiation detector is abnormal when the difference data is smaller than predetermined lower limit checking data or larger than predetermined upper limit checking data.

According to a fourth aspect of the present invention, in the dose detector of the third aspect, the noise is background noise caused by background in a radiation exposed area. The data processor includes a unit for judging whether the dose count data is larger than predetermined dose boundary data; a unit for obtaining difference data between the dose count data and the check count data when the dose count data is larger than the predetermined dose boundary data, and a unit for judging that the semiconductor radiation detector is abnormal because of outputting too small background noise when the difference data is smaller than the lower limit checking data, and that the semiconductor radiation detector is abnormal because of outputting too large background noise when the difference data is larger than the upper limit checking data.

According to a fifth aspect of the present invention, in the dose detector of the third aspect, the noise is white noise caused by the semiconductor radiation detector in a radiation shielded area. The data processor includes a unit for judging whether the dose count data is smaller than predetermined dose boundary data; a unit for obtaining difference data between the dose count data and the check count data when the dose count data is smaller than the predetermined dose boundary data, and a unit for judging that the semiconductor radiation detector is abnormal because of outputting too small white noise when the difference data is smaller than the lower limit checking data, and that the semiconductor radiation detector is abnormal because of outputting too large white noise when the difference data is larger than the upper limit checking data.

According to a sixth aspect of the present invention, in the dose detector of one of the first to fifth aspects, the dose detector further includes: a temperature compensator connected to the data processor for measuring an environmental temperature to output temperature data; and a data generating unit for increasing the lower limit checking data and the upper limit checking data when the environmental temperature is high to generate new lower limit checking data and new upper limit checking data.

According to a seventh aspect of the present invention, in the dose detector of one of the first to sixth aspects, the data processor operates at a predetermined interval to operate the units.

According to an eighth aspect of the invention, a dosimeter includes the dose detector of one of the first to seventh aspects for judging whether the semiconductor radiation detector is deteriorated.

According to the invention, it is possible to provide the dose detector capable of checking the radiation detector simply and safely with a simple structure, and the dosimeter provided with the dose detector.

DETAILED DESCRIPTION OF PREFERRED EMBODIMENTS

Figure 1:
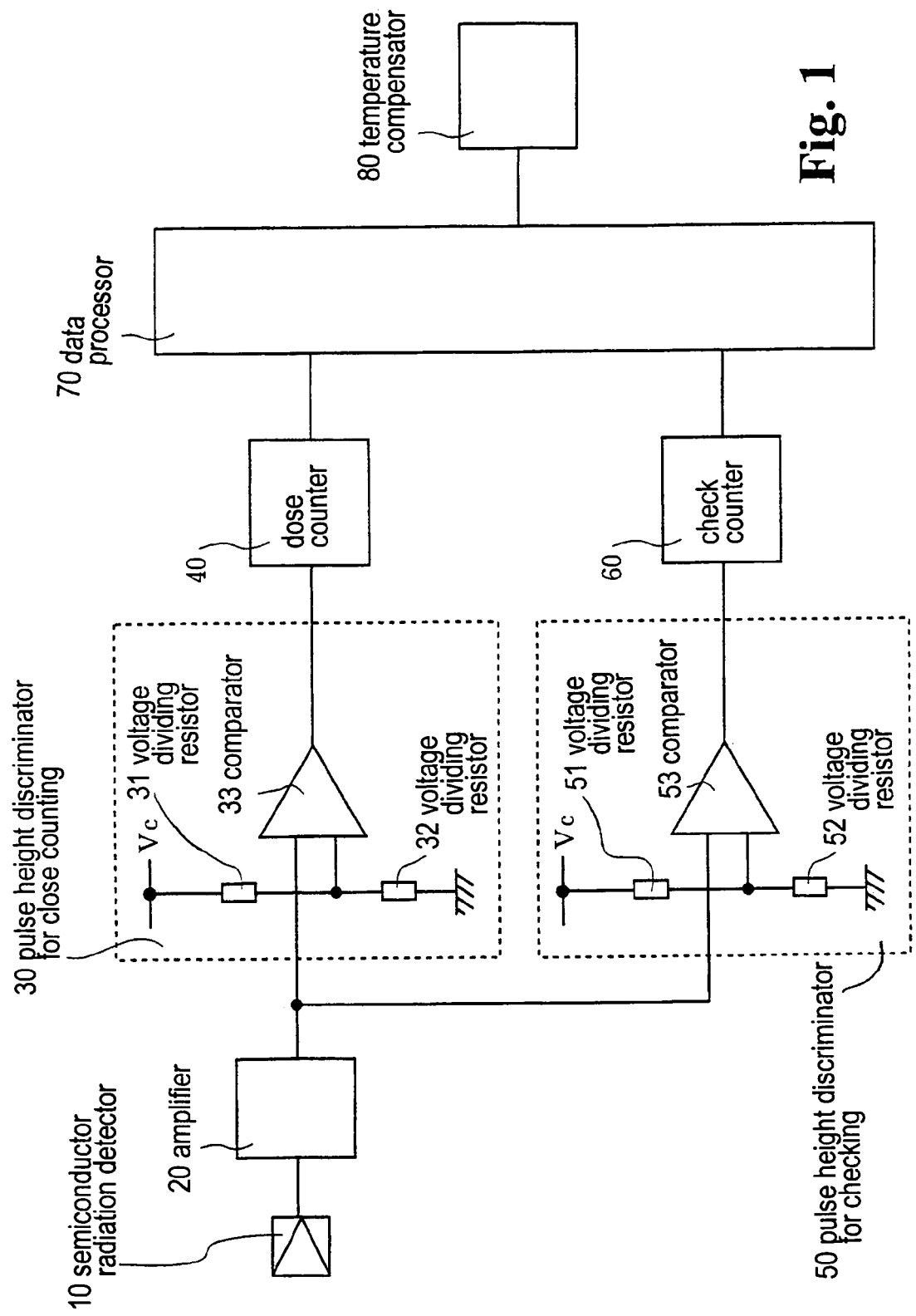
FIG. 1 is a block circuit diagram of a dose detector with a function of checking according to an embodiment of the invention.
Figure 2:
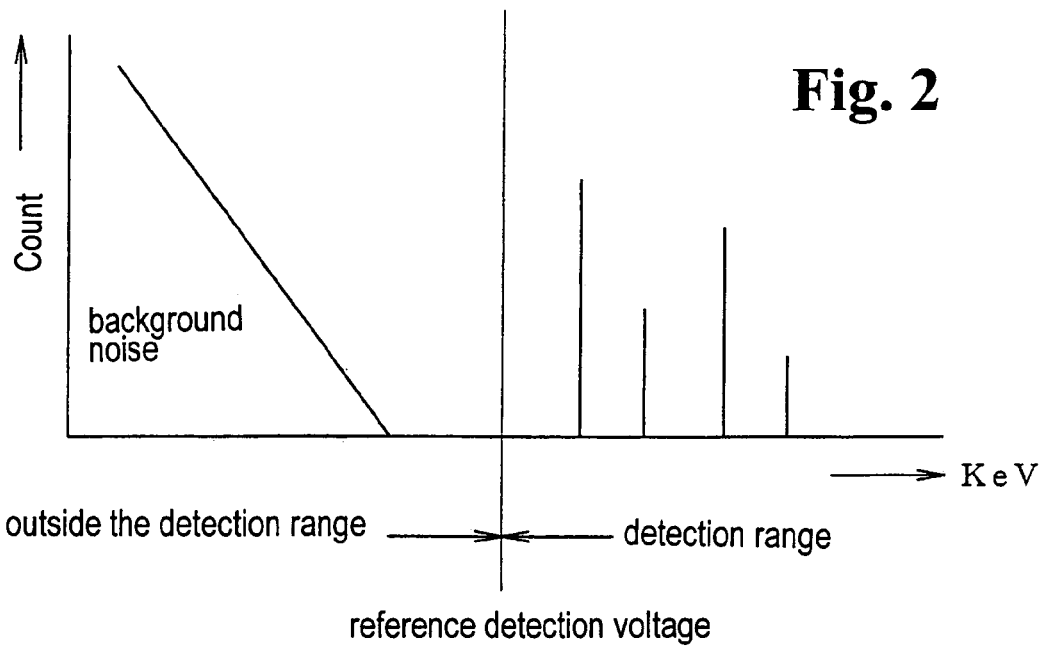
FIG. 2 is a graph showing a count value to wave height voltage characteristic of a dose counter shown in FIG. 1.
Figure 3:
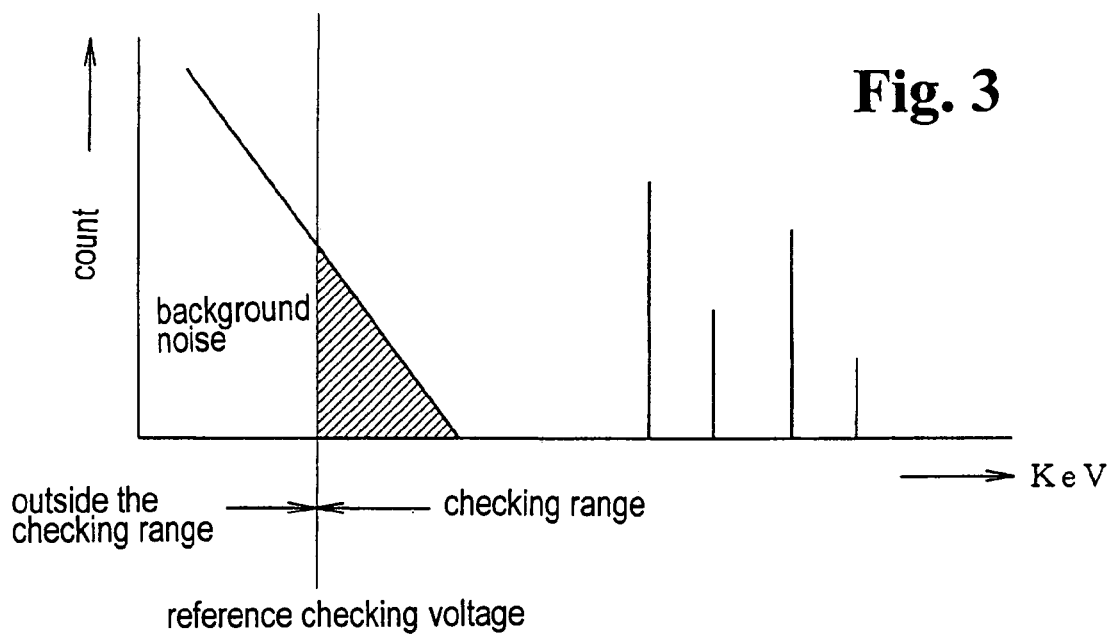
FIG. 3 is a graph showing a count value to wave height voltage characteristic of a check counter shown in FIG. 1.

Hereunder, embodiments of the invention will be described in detail with reference to the accompanied drawings. FIG. 1 is a block circuit diagram of a dose detector 1 having a check facility according to an embodiment of the invention. FIG. 2 is a graph showing a count value to wave height voltage characteristic of a dose counter in FIG. 1. FIG. 3 is a graph showing a count value to wave height voltage characteristic for a check counter in FIG. 1. As shown in FIG. 1, the dose detector 1 includes a semiconductor radiation detector 10, an amplifier 20, a first pulse height discriminator 30 for dose counting, a dose counter 40, a second pulse height discriminator 50 for checking, a check counter 60, a data processor 70, and a temperature compensator 80.

The semiconductor radiation detector 10 outputs detection signals in response to radiation detection. The semiconductor radiation detector 10 is capable of detecting various kinds of nuclear radiations (γ-rays (X-rays), charged particles (α-rays, β-rays), and neutrons). The present invention is applicable to detecting the nuclear radiations listed above, and they will be referred to collectively as nuclear radiations.

The amplifier 20 amplifies the detection signals to adjust the amplitude voltages (wave height voltages) of the detection signals appropriately and outputs the detection signals, after the wave heights thereof are adjusted. When the wave heights of the detection signals are high enough, the amplifier 20 may be omitted.

The first pulse height discriminator 30 discriminates the detection signals with wave height voltages higher than a reference detection voltage to remove noise from the detection signals. The first pulse height discriminator 30 converts the discriminated detection signals to pulse signals and outputs the converted pulse signals. In detail, the first pulse height discriminator 30 is a discriminator circuit, which inputs the reference detection voltage determined by voltage dividing resistors 31 and 32 to a comparator 33 and outputs the signals with voltages higher than the reference detection voltage in the form of pulse signals. The dose counter 40 counts the signals outputted from the first pulse height discriminator 30 and outputs dose count data.

If the first pulse height discriminator 30 is eliminated from the detection system that usually includes, the first pulse height discriminator 30 and the dose counter 40, the outputs from the dose counter 40 will include background noise as illustrated in FIG. 2 by the count value to wave height voltage characteristic. Since the first pulse height discriminator 30 outputs the signals with output voltages higher than the reference detection voltage as the signals to be detected and eliminates the signals, the output voltages thereof are lower than the reference detection voltage as the signals unnecessary to detect, so that the dose count data includes only the data of the nuclear radiations to be detected.

The reference checking wave height voltage for checking (hereinafter referred to as the reference checking voltage) for the second pulse height discriminator 50 is set to be lower than the reference detection voltage to make the detection signals outputted via the semiconductor radiation detector 10 and the amplifier 20 contain some background noise. The second pulse height discriminator 50 discriminates the detection signals with wave height voltages higher than a reference checking voltage, and converts the discriminated detection signals to pulse signals and outputs the converted pulse signals. In detail, the second pulse height discriminator 50 is a discriminator circuit, which inputs the reference checking voltage determined by voltage dividing resistors 51 and 52 to a comparator 53 and outputs the signals with output voltages higher than the reference checking voltage in the form of pulse signals.

The check counter 60 counts the signals outputted from the second pulse height discriminator 50 and outputs check count data. The checking system including the second pulse height discriminator 50 and the check counter 60 outputs check count data containing some background noise with wave height voltages higher than the predetermined wave height voltage as illustrated in FIG. 3 by the count value to wave height voltage characteristic shown.

The dose count data from the dose counter 40 and the check count data from the check counter 60 are inputted to the data processor 70. The data processor 70 conducts various data processing operations described later. The temperature compensator 80 is connected to the data processor 70. The temperature compensator 80 measures the environmental temperature and outputs the temperature data to the data processor 70. The data processor 70 appropriately conducts compensation processing depending on the environmental temperature as described later.

The dose detection that the dose detector 1 conducts will be described below. In the radioisotope facilities as well as in the outdoor, the background and the nuclear radiations to be detected are detected by the semiconductor radiation detector 10. An output from the semiconductor radiation detector 10 exhibits a characteristic shown in FIG. 2. The horizontal axis of FIG. 2 represents the output voltage (keV), i.e. the wave height. The vertical axis of FIG. 2 represents the count. As shown in FIG. 2, the detection signal contains background noise with low wave height, and the detection signal of the specified nuclear radiations with high wave height is also contained.

The first pulse height discriminator 30 removes the detection signals with output voltages lower than the reference detection voltage, i.e. background noise, and outputs the pulse signals with output voltages higher than the reference detection voltage, i.e. the targeted pulse signals indicating the nuclear radiations to be detected. Therefore, the dose counter 40 usually outputs the dose count data, i.e. the counts of the targeted nuclear radiations (e.g. from 30 to 50).

The second pulse height discriminator 50 outputs the detection signals with output voltages higher than the reference checking voltage. Since the reference checking voltage is set to be lower than the reference detection voltage for the first pulse height discriminator 30, the second pulse height discriminator 50 outputs pulse signals indicating the detection signals of the nuclear radiations to be detected and some background noise. Therefore, the check counter 60 outputs check count data indicating the numerical values larger than the dose count data (e.g. from 3000 to 5000).

Such check count data, however, is inputted to the data processor 70, yet will not be used during normal detection. When the temperature data outputted from the temperature compensator 80 is within the normal temperature range (equal to or higher than the lower temperature limit data and equal to or lower than the upper temperature limit data), the detected dose count data is used as it is. When the temperature data outputted from the temperature compensator 80 is larger than the upper temperature limit data, the temperature compensator 80 conducts compensation for reducing an increment of the dose count data caused by thermal noise. As described above, the data processor 70 outputs only the dose count data to, for example, a display (not shown) during the normal detection.

The data processor 70, which conducts the detection operations as described above, conducts checking operations to check whether the detection system is functioning properly when a predetermined period of time elapses. The checking operations are conducted according to the predetermined process described by the flow chart shown in FIG. 4. A checking process in the normal operations will be described below. Different detection principles are applied depending on whether the checking process is conducted in a radiation exposed area such as in the radioisotope facilities and the outdoor or in a radiation shielded area such as in a room surrounded by radiation shield stuffs. A checking processes that consider the difference will be described below.

(1) Checking Process in the Radiation Exposed Area Such as in the Radioisotope Facilities and in the Outdoor When the Semiconductor Radiation Detector 10 is Working in the Normal Manner The first pulse height discriminator 30 outputs pulse signals indicating the detection signals with output voltages higher than the reference detection voltage, and the dose counter 40 outputs dose count data indicating usual numerical values (e.g. from 30 to 50). The second pulse height discriminator 50 outputs pulse signals indicating the detection signals with output voltages higher than the reference checking voltage, and the check counter 60 outputs check count data indicating usual numerical values (e.g. from 3000 to 5000).

First, the data processor 70 inputs thereto the temperature data of the environment from the temperature compensator 80. When the temperature is high (when the temperature data is higher than the upper temperature limit data), the data processor 70 generates new dose boundary data obtained by increasing the dose boundary data, new lower limit checking data obtained by increasing the lower limit checking data, and new upper limit checking data obtained by increasing the upper limit checking data. By increasing the dose boundary data, the lower limit checking data, and the upper limit checking data, the judgments described later will be conducted correctly even when the thermal noise from the semiconductor radiation detector increase to further raise the wave heights of the background noise and the white noise. When the temperature value in the temperature data is within the usual temperature range, (when the temperature data is higher than the lower temperature limit data and lower than the upper temperature limit data), the temperature compensation is not conducted (step S1 in FIG. 4).

Figure 4:
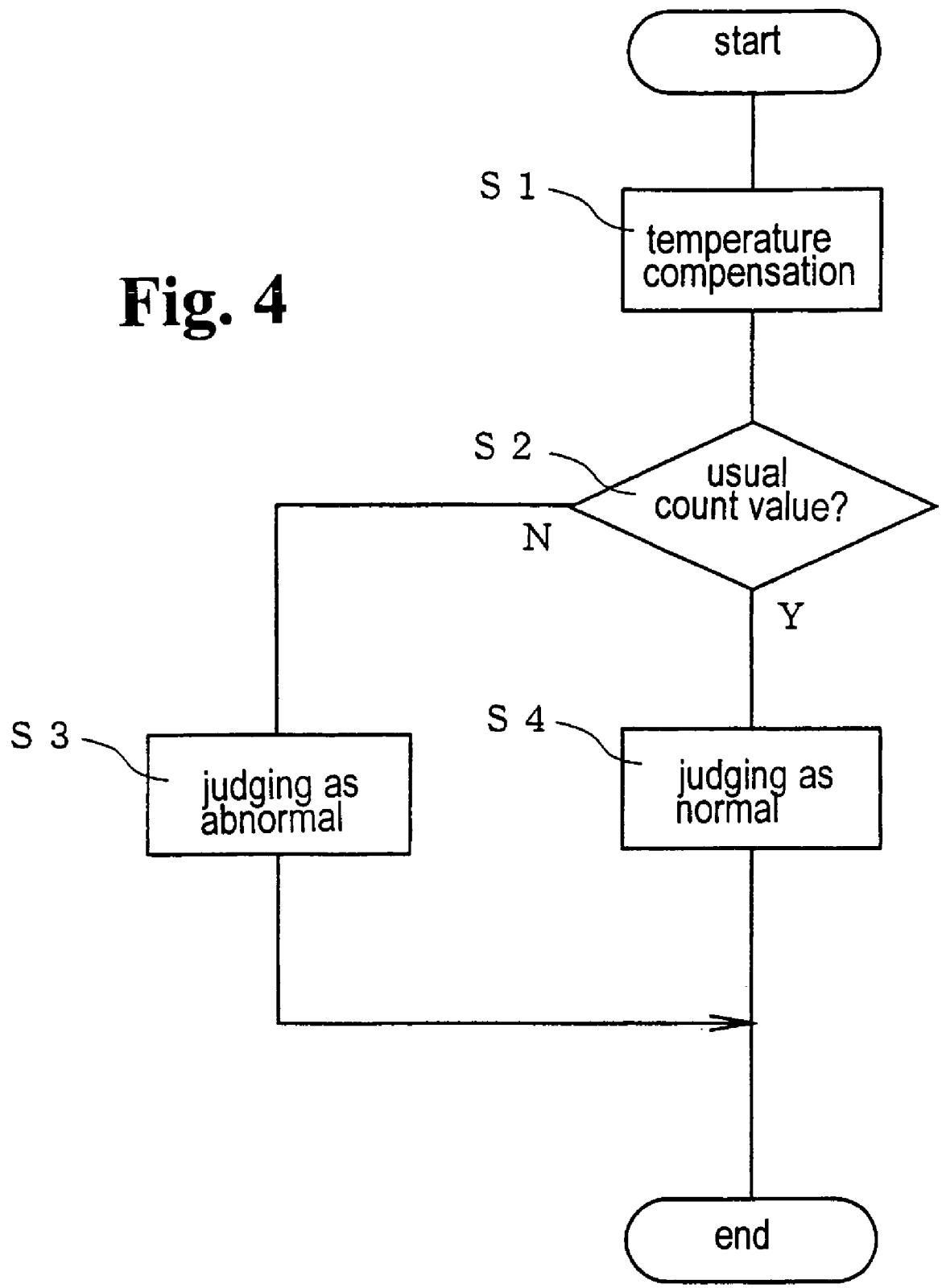
FIG. 4 is a flow chart showing a checking process.

Then, the data processor 70 judges whether the dose count data and the check count data are usual (step S2 in FIG. 4). In detail, the judgment in the step S2 is conducted in the following manner. The data processor 70 judges whether the dose count data exceeds the predetermined dose boundary data. The dose boundary data is an integer larger than 0 and smaller than the usually obtained dose count data such as 10. When the dose count data exceeds the dose boundary data to the larger side, it is judged that the nuclear radiations are detected and the semiconductor radiation detector 10 is in the radiation exposed area. The data processor 70 subtracts the dose count data from the check count data to calculate difference data indicating only the background noise component. The data processor 70 judges that the difference data is a usual value when the difference data is between the predetermined lower limit checking data (e.g. 1000) and the predetermined upper limit checking data (e.g. 10000) (YES in step S2 in FIG. 4). The data processor 70 judges that the semiconductor radiation detector 10 is working in the normal manner (step S4 in FIG. 4). The checking process is conducted in the normal operations as described above.

Figure 5:
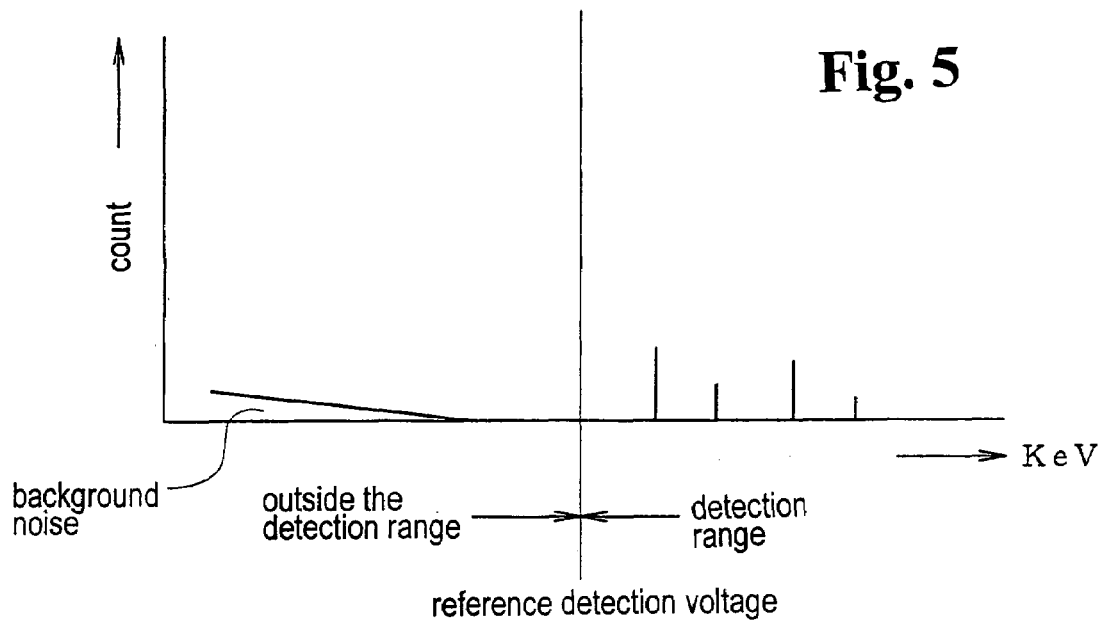
FIG. 5 is a graph showing a count value to wave height voltage characteristic of the dose counter.
Figure 6:
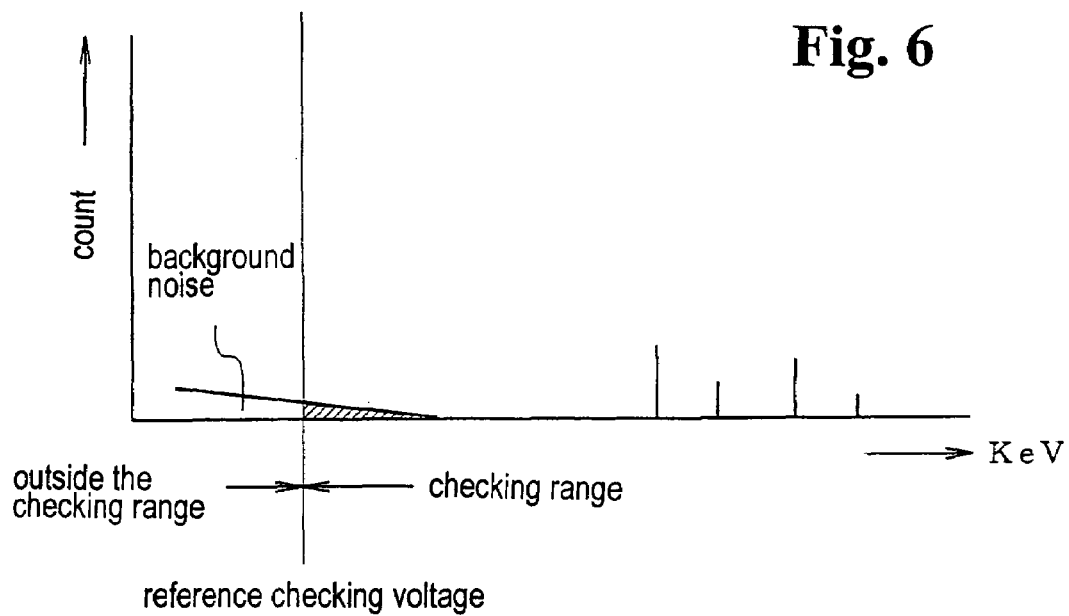
FIG. 6 is a graph showing a count value to wave height voltage characteristic for the check counter.

(2) Checking Process in the Radiation Exposed Area Such as in the Radioisotope Facilities and in the Outdoor When the Semiconductor Radiation Detector 10 is Abnormal When the semiconductor radiation detector 10 is abnormal and the wave heights of the detected signals become low for example, neither radioactive ray detection signals nor background noise are outputted, or few radioactive ray detection signals and few background noise are outputted as described in FIGS. 5 and 6. In this case, the checking process is conducted as described below.

The first pulse height discriminator 30 outputs pulse signals indicating the detection signals with output voltages higher than the reference detection voltage, and the dose counter 40 outputs dose count data indicating numerical values smaller than the usual numerical values (e.g. from 20 to 30). The second pulse height discriminator 50 outputs pulse signals indicating the detection signals with output voltages higher than the reference checking voltage, and the check counter 60 outputs check count data indicating numerical values smaller than the usual numerical values (e.g. from 200 to 300).

The data processor 70 conducts the temperature compensation (step S1 in FIG. 4) and, then, judges whether the dose count data and the check count data are usual (step S2 in FIG. 4). The judgments in the step S2 are conducted in the following manner. First, the data processor 70 judges whether the dose count data is larger than the predetermined dose boundary data. Although the dose count data is smaller than the usual data, the dose count data is much larger than, the predetermined dose boundary data (e.g. 10). Therefore, the data processor 70 judges that the semiconductor radiation detector 10 is in the radiation exposed area, in which the nuclear radiations is detectable.

Then, the data processor 70 subtracts the dose count data from the check count data to calculate difference data indicating only the background noise component. The data processor 70 judges that the difference data is not a usual value when the difference data is smaller than the predetermined lower limit checking data (e.g. 1000) (NO in step S2 in FIG. 4). The data processor 70 judges that the semiconductor radiation detector 10 is abnormal, since the semiconductor radiation detector 10 outputs background noise much less than usual (step S3 in FIG. 4). When the data processor 70 judges that the semiconductor radiation detector 10 is abnormal, the data processor 70 notifies the anomaly through a display and/or a speaker (not shown). Thus, the anomaly is detected in which the semiconductor radiation detector 10 does not output the detection signal in the radiation exposed area.

(3) Checking Process in the Radiation Exposed Area Such as in the Radioisotope Facilities and in the Outdoor When the Semiconductor Radiation Detector 10 is Abnormal When the semiconductor radiation detector 10 is abnormal and the noise component increases due to the failure of the semiconductor radiation detector 10, the checking process is conducted as described below.

Figure 7:
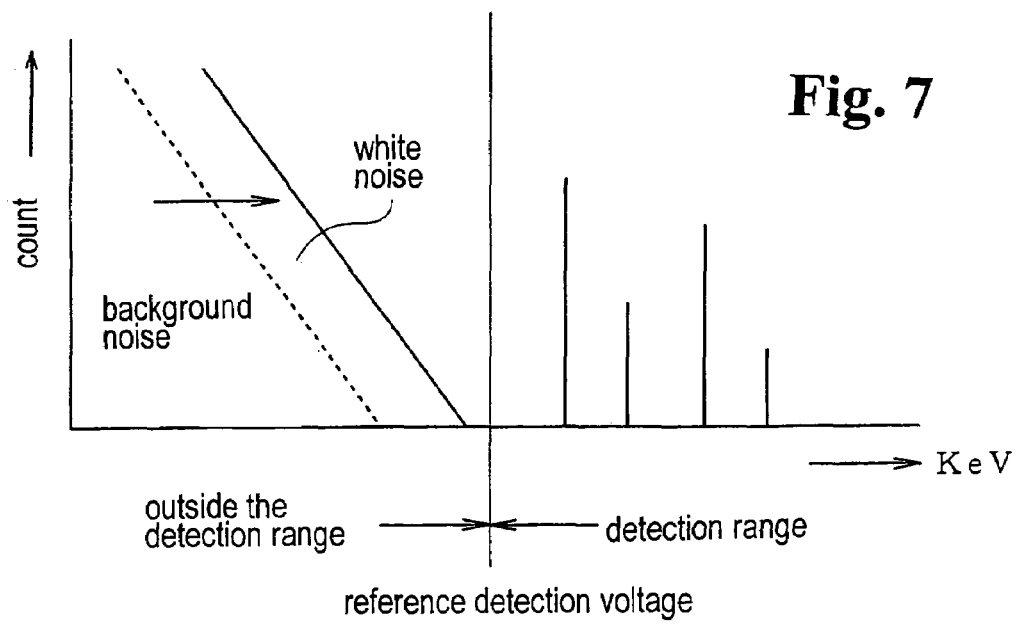
FIG. 7 is a graph showing a count value to wave height voltage characteristic of the dose counter.
Figure 8:
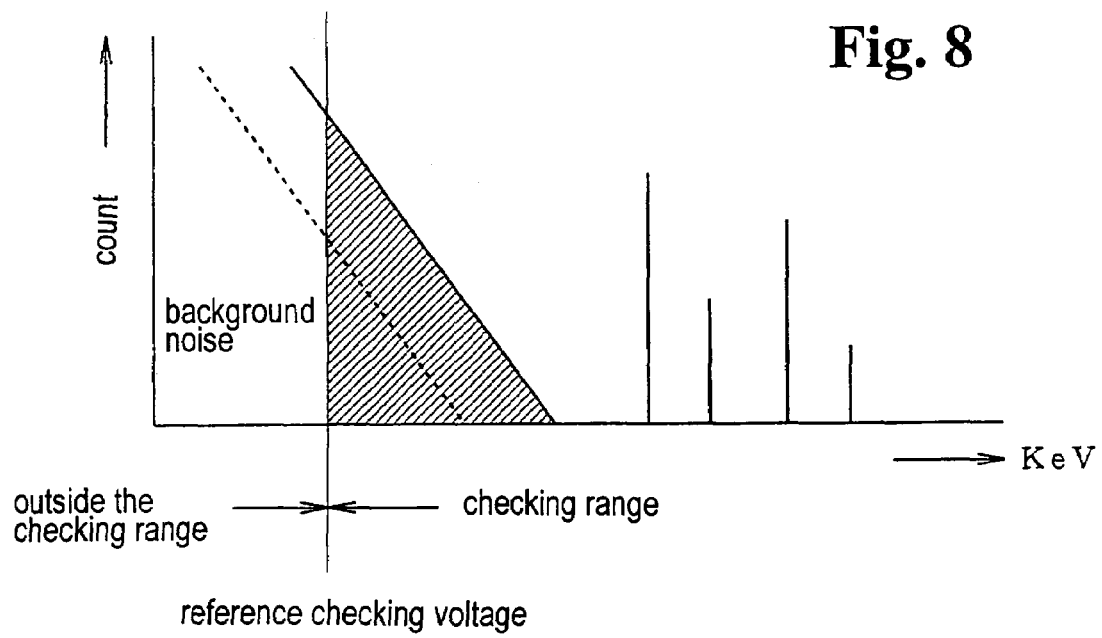
FIG. 8 is a graph showing a count value to wave height voltage characteristic for the check counter.

Damages caused by nuclear radiations are accumulated in the semiconductor radiation detector 10. The accumulated damages deteriorate the characteristics of the semiconductor radiation detector 10 almost indefinitely and, finally, cause the phenomena called total dose effects, which destroy the functions of the semiconductor radiation detector 10. This will cause (a) positive charge capture (hole trap, charge trap), (b) bulk damages (crystal lattice defects), and (c) interface state. Sometimes, these deteriorating phenomena change the electrical characteristics of the semiconductor radiation detector 10, thermal noise are increased by the temperature rise during the operations thereof caused by leakage current increase and resistance increase, and the white noise output level rises. The white noise is a thermal noise caused by irregular motions of electrons in the semiconductor radiation detector 10. The white noise increases with temperature. The white noises have almost the same wave height independently of the frequencies thereof. In this case, the white noises overlap with the radiation signals and the background noise as described in FIGS. 7 and 8, thereby increasing the total number of the noise components.

The first pulse height discriminator 30 outputs pulse signals indicating the detection signals with output voltages higher than the reference detection voltage, and the dose counter 40 outputs dose count data indicating usual numerical values (e.g. from 30 to 50). The second pulse height discriminator 50 outputs pulse signals indicating the detection signals with output voltages higher than the reference checking voltage, and the check counter 60 outputs check count data indicating too large numerical values (e.g. from 30000 to 50000).

The data processor 70 conducts the temperature compensation (step S1 in FIG. 4) and, then,; judges whether the dose count data and the check count data are usual (step S2 in FIG. 4). The judgments in the step S2 are conducted in the following manner. First, the data processor 70 judges whether the dose count data is larger than the predetermined dose boundary data (e.g. 10). The dose count data is much larger than the dose boundary data. Therefore, the data processor 70 judges that the semiconductor radiation detector 10 has detected nuclear radiations with the dose count data larger than the predetermined dose boundary data and the semiconductor radiation detector 10 is in the radiation exposed area.

Then, the data processor 70 subtracts the dose count data from the check count data to calculate difference data indicating only the background noise component. The data processor 70 judges that the difference data is not a usual value (NO in step S2 in FIG. 4) when the difference data is much larger than the predetermined upper limit checking data (e.g. 10000), since the semiconductor radiation detector 10 outputs background noise much more than usual. Then, the data processor 70 judges that the semiconductor radiation detector 10 is abnormal (step S3 in FIG. 4). When the data processor 70 judges that the semiconductor radiation detector 10 is abnormal, the data processor 70 notifies the anomaly through a display and/or a speaker (not shown). Thus, the anomaly, which terminates the life of the semiconductor radiation detector 10, caused by the aged deterioration due to detecting nuclear radiations is detected.

Figure 9:
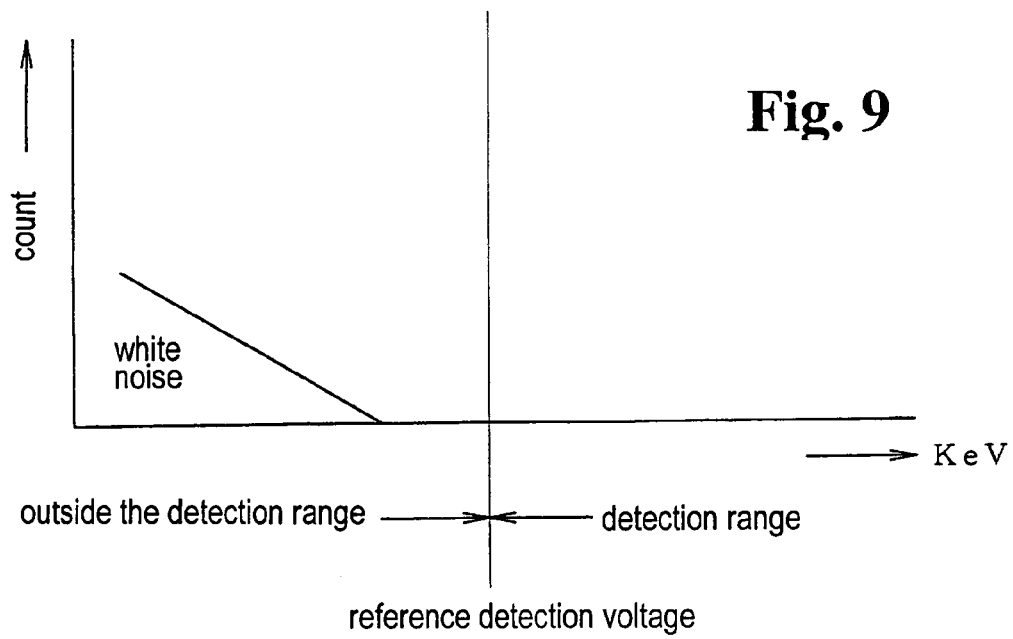
FIG. 9 is a graph showing a count value to wave height voltage characteristic of the dose counter.
Figure 10:
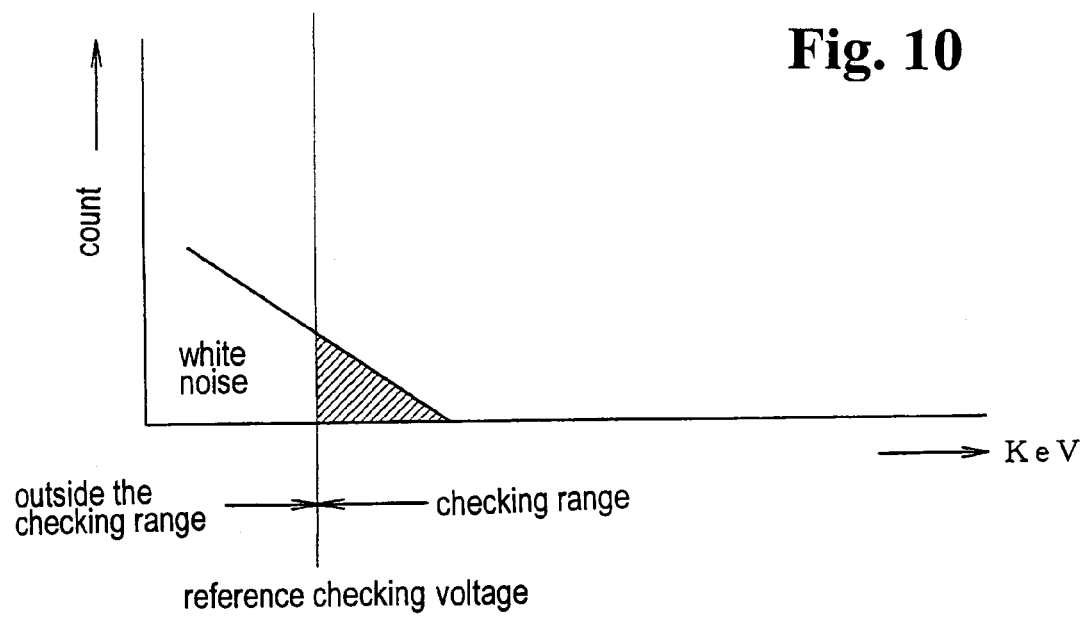
FIG. 10 is a graph showing a count value to wave height voltage characteristic for the check counter.

(4) Checking Process in the Radiation Shielded Area When the Semiconductor Radiation Detector 10 is Working in the Normal Manner When the semiconductor radiation detector 10 is in a radiation shielded area, the nuclear radiations to be measured and the background do not reach the semiconductor radiation detector 10. Therefore, the semiconductor radiation detector 10 outputs only the white noise as shown in FIGS. 9 and 10. The first pulse height discriminator 30 outputs no signal, since the detection signal with output voltage higher than the reference detection voltage is not detected and the detection signals with output voltages lower than the reference detection voltage, i.e. white noise, are removed. Therefore, the dose counter 40 usually outputs the dose count data indicating 0.

The second pulse height discriminator 50 outputs pulse signals indicating the detection signals with output voltages higher than the reference checking voltage, and the check counter 60 outputs check count data indicating usual numerical values (e.g. from 3000 to 5000). The data processor 70 conducts the temperature compensation (step S1 in FIG. 4) and, then, judges whether the dose count data and the check count data are usual (step S2 in FIG. 4).

The judgments in the step S2 are conducted in the following manner. First, the data processor 70 judges whether the dose count data is smaller than the predetermined dose boundary data (e.g. 10). Since the semiconductor radiation detector 10 is in the radiation shielded area, the dose count data is 0, which is smaller than the dose boundary data. Therefore, the data processor 70 judges that the semiconductor radiation detector 10 is in the radiation shielded area. Since the dose boundary data is set at 10, which is larger than 0, any misjudgment will not be caused, even if the dose count data is a value such as from 3 to 5 due to the noise involved. Then, the data processor 70 subtracts the dose count data from the check count data to calculate difference data indicating only the white noise component. The data processor 70 judges that the difference data is a usual value (YES in step S2 in FIG. 4) when the difference data is in the range between the predetermined lower limit checking data (e.g. 1000) and the predetermined upper limit checking data (e.g. 10000). And, the data processor 70 judges that the semiconductor radiation detector 10 is normal (step S4 in FIG. 4). The checking processes for the semiconductor radiation detector 10 working in the normal manner are conducted as described above.

Since the dose count data from the dose counter 40 often becomes 0 or a small numerical value in the radiation shielded area, it is often misjudged as abnormal according to the conventional techniques that the semiconductor radiation detector 10 has failed to detect nuclear radiations and, therefore, the semiconductor radiation detector 10 is abnormal. If the dose detector 1 judges that the semiconductor radiation detector 10 capable of detecting the white noise in the radiation shielded area is working in the normal manner, the dose detector 1 will not misjudge in detecting in the radiation shielded area. A dose detector that conducts such a simple checking process as described above will be described below.

The semiconductor radiation detector 10 outputs only the white noise as described in FIGS. 9 and 10. The data processor 70 judges whether the dose count data is smaller than the predetermined dose boundary data (e.g. 10). When the dose count data is smaller than the predetermined dose boundary data, the dose detector 1 judges that the semiconductor radiation detector 10 is in a radiation shielded area. The data processor 70 judges whether the check count data is larger than the predetermined lower limit checking data (e.g. 1000) When the check count data is larger than the predetermined lower limit checking data, the data processor 70 judges that the semiconductor radiation detector 10 is working in the normal manner, since the semiconductor radiation detector 10 is capable of detecting the white noise in the radiation shielded area. The dose detector that conducts such a simple checking process as described above facilitates preventing misjudgment from causing in the radiation shielded area, in which it is often misjudged that the semiconductor radiation detector does not output any dose count and the semiconductor radiation detector is abnormal. Therefore, the performances of the dose detector are greatly improved.

(5) Checking Process in the Radiation Shielded Area When the Semiconductor Radiation Detector 10 is Abnormal.

Figure 11:
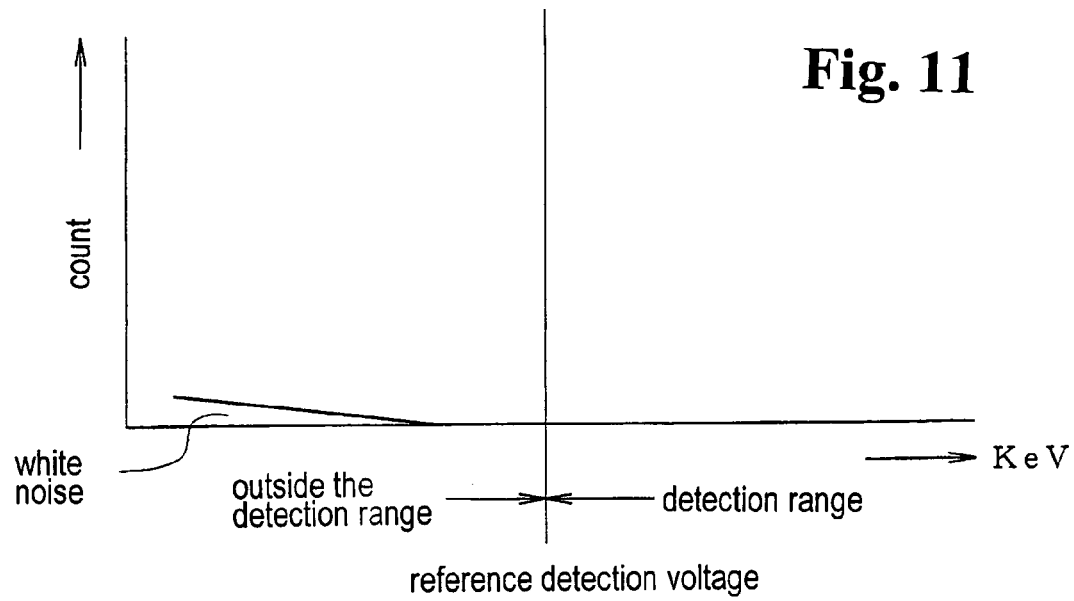
FIG. 11 is a graph showing a count value to wave height voltage characteristic of the dose counter.
Figure 12:
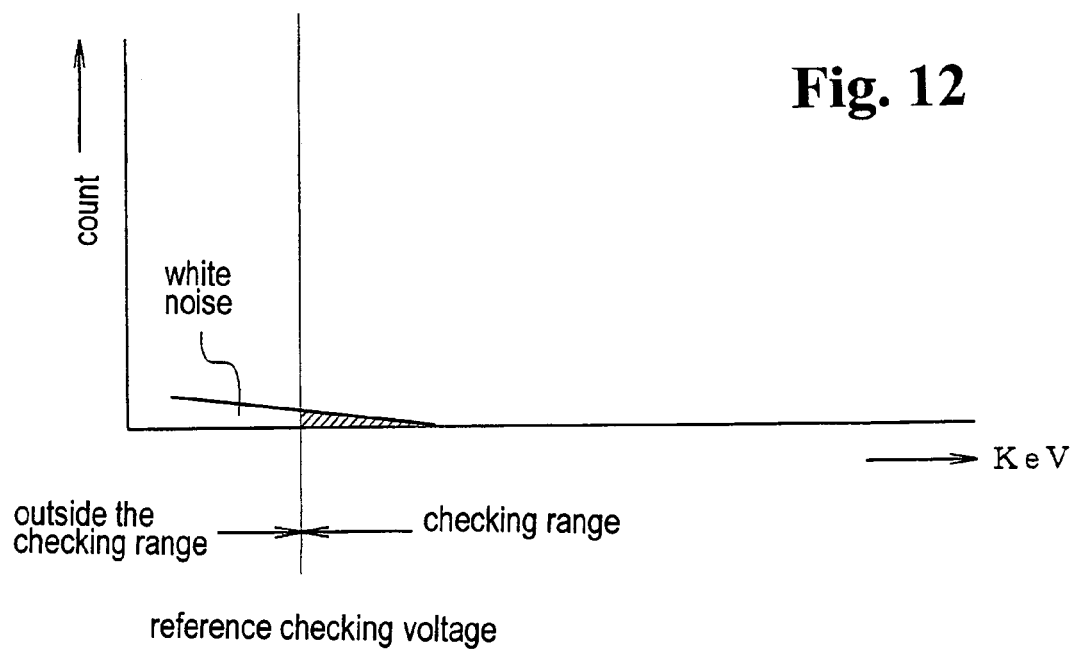
FIG. 12 is a graph showing a count value to wave height voltage characteristic for the check counter.

In this case, the wave heights of the white noise are low as shown in FIGS. 11 and 12. The first pulse height discriminator 30 does not output anything, since any detection signal with output voltage higher than the reference detection voltage is not detected and the detection signals with output voltages lower than the reference detection voltage, i.e. white noise, are removed. Therefore, the dose counter 40 usually outputs the dose count data indicating 0. The second pulse height discriminator 50 outputs the pulse signals indicating the detection signals with output voltages higher than the reference checking voltage. The check counter 60 outputs check count data indicating numerical values (e.g. from 30 to 50) smaller than the usual numerical values, since the wave heights of the detection signals based on the white noise are low.

The data processor 70 conducts the temperature compensation described in the flow chart of FIG. 4 on the dose count data and the check count data, if necessary (step S1 in FIG. 4). Then, the data processor 70 judges whether the dose count data and the check count data are usual (step S2 in FIG. 4). The judgments in the step S2 are conducted in the following manner. First, the data processor 70 judges whether the dose count data is smaller than the predetermined dose boundary data (e.g. 10). Since the semiconductor radiation detector 10 is in the radiation shielded area, the dose count data is 0 or close to 0, which is smaller than the dose boundary data. Therefore, the data processor 70 judges that the semiconductor radiation detector 10 is in the radiation shielded area.

Then, the data processor 70 subtracts the dose count data from the check count data to calculate difference data indicating only the white noise component. The data processor 70 judges that the difference data is not a usual value (NO in step S2 in FIG. 4), since the difference data is smaller than the predetermined lower limit checking data (e.g. 1000). Since the semiconductor radiation detector 10 outputs the white noise much less than usual, the data processor 70 judges that the semiconductor radiation detector 10 is abnormal (step S3 in FIG. 4). When the data processor 70 judges that the semiconductor radiation detector 10 is abnormal, the data processor 70 notifies the anomaly through a display and/or a speaker (not shown). The anomaly, in which the semiconductor radiation detector 10 outputs too small dose count in the radiation shielded area, is detected.

Figure 13:
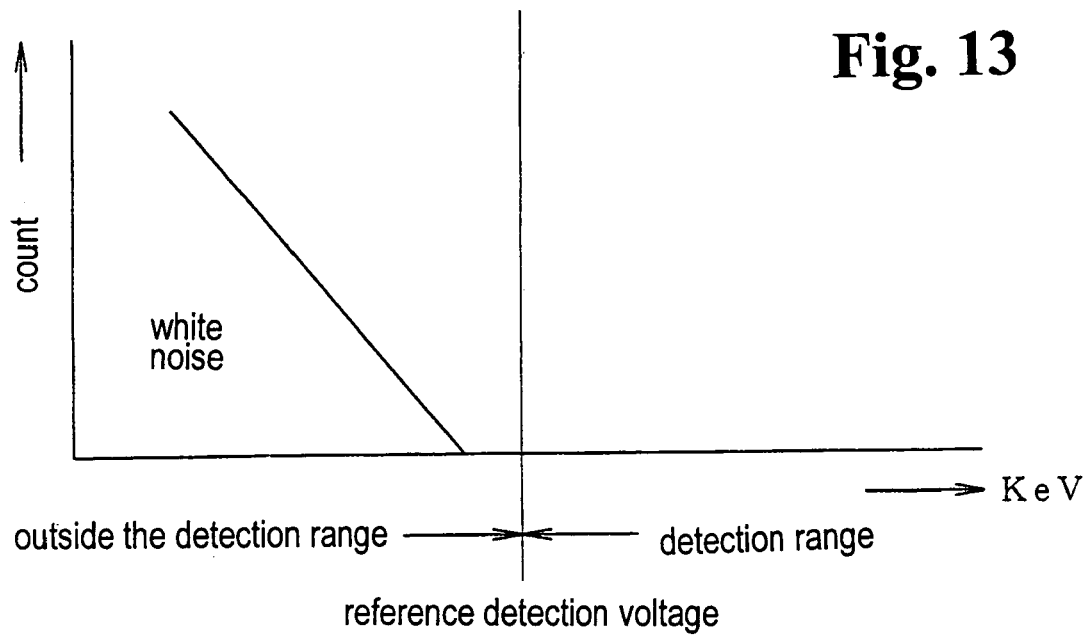
FIG. 13 is a graph showing a count value to wave height voltage characteristic of the dose counter.
Figure 14:
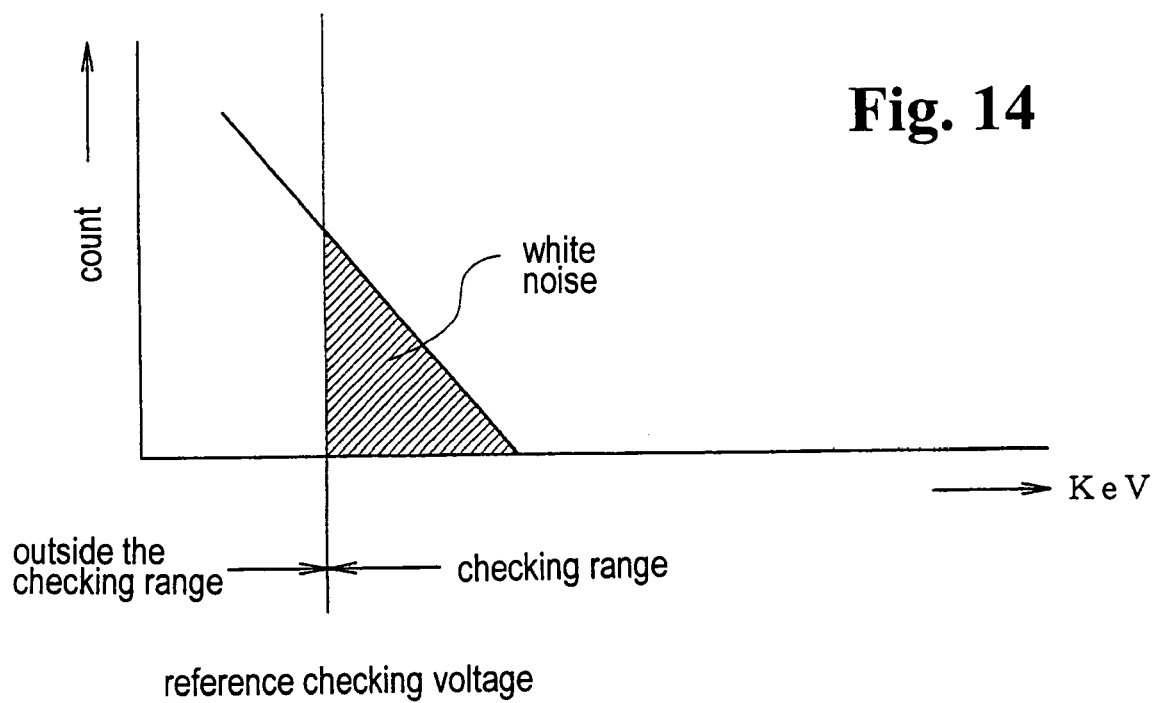
FIG. 14 is a graph showing a count value to wave height voltage characteristic for the check counter.
Figure 15:
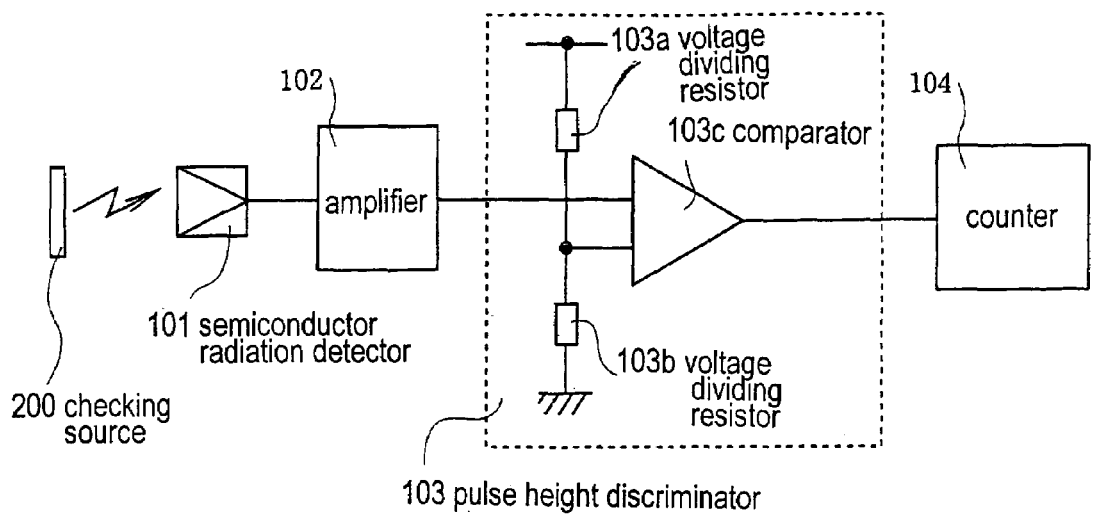
FIG. 15 is a block circuit diagram showing a conventional dose detector embedded in a dosimeter.
Figure 16:
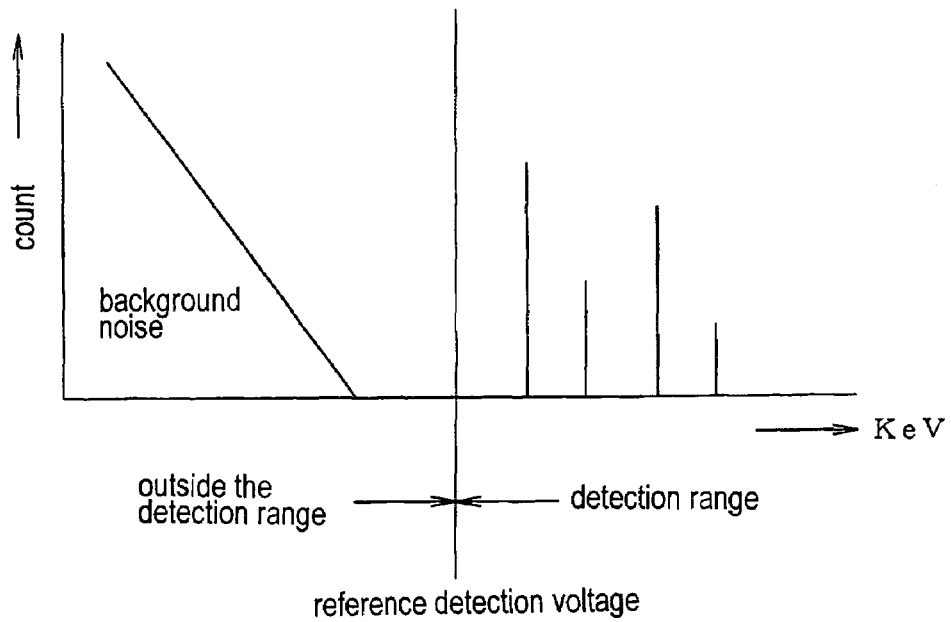
FIG. 16 is a graph showing a count value to wave height voltage characteristic of a conventional dose detector.

(6) Checking Process in the Radiation Shielded Area When the Semiconductor Radiation Detector 10 is Abnormal When the semiconductor radiation detector 10 is abnormal and the noise component increases due to the failure of the semiconductor radiation detector 10, the checking process is conducted as described below. In this case, the white noise will significantly increase as shown in FIGS. 13 and 14. The first pulse height discriminator 30 does not output anything, since any detection signal with output voltage higher than the reference detection voltage is not detected and the detection signals with output voltages lower than the reference detection voltage, i.e. white noise, are removed. Therefore, the dose counter 40 usually outputs the dose count data indicating 0.

The second pulse height discriminator 50 outputs pulse signals indicating the detection signals with output voltages higher than the reference checking voltage, and the check counter 60 outputs check count data indicating numerical values (e.g. 20000) too much larger than the usual numerical values, since the white noise with high wave heights causes detection signals. The data processor 70, to which the dose count data and the check count data described above are inputted, conducts the temperature compensation (step S1 in FIG. 4) in the checking process flow chart shown in FIG. 4 and, then, judges whether the dose count data and the check count data are usual (step S2 in FIG. 4).

The judgments in the step S2 are conducted in the following manner. First, the data processor 70 judges whether the dose count data is smaller than the predetermined dose boundary data (e.g. 10). The dose count data is 0 or close to 0 and smaller than the dose boundary data. Therefore, the data processor 70 judges that the semiconductor radiation detector 10 is in the radiation shielded area.

Then, the data processor 70 subtracts the dose count data from the check count data to calculate difference data indicating only the white noise component. The data processor 70 judges that the difference data is not a usual value (NO in step S2 in FIG. 4), since the difference data is much larger than the predetermined upper limit checking data (e.g. 10000). The data processor 70 judges that the semiconductor radiation detector 10 that outputs too many white noise is abnormal (step S3 in FIG. 4). When the data processor 70 judges that the semiconductor radiation detector 10 is abnormal, the data processor 70 notifies the anomaly through a display and/or a speaker (not shown). Thus, the anomaly, which terminates the life of the semiconductor radiation detector 10, caused by the aged deterioration due to detecting nuclear radiations is detected.

In the above descriptions, the same lower limit checking data and the same upper limit checking data are used for detecting the white noise and the background noise. Alternatively, different lower limit checking data and different upper limit checking data may be used for detecting the white noise and the background noise. For example, the background count data is obtained by measuring background noise in the radiation exposed area in advance, and the white noise count data is obtained by measuring white noise in the radiation shielded area in advance. The lower limit checking data for background noise detection, the lower limit checking data for white noise detection, the upper limit checking data for background noise detection, and the upper limit checking data for white noise detection are calculated from the background count data and the white noise count data obtained in advance. And, the calculated lower limit checking data and the calculated upper limit checking data are set in the data processor 70. The calculated lower limit checking data and the calculated upper limit checking data set in the data processor 70 facilitate accurate checking.

The optimum values for the dose boundary data, the lower limit checking data, and the upper limit checking data are different depending on the semiconductor radiation detector 10 or the circuit systems of the dose detector 1. It is necessary to obtain the optimum values experimentally in the course of designing. Although it is not appropriate to describe specific values here for the optimum data, the values as described above may be employable.

The dose counter 40 and the check counter 60 may be integrated into the data processor 70 as the counter unit thereof. The dosimeter having the dose detector according to the invention facilitates checking whether the dose detector is working in the normal manner without a checking operation of a user. Therefore, the dosimeter with the dose detector according to the invention thereon is used conveniently.

The dose detector and the dosimeter according to the invention exhibit the following advantages.

(1) Since the nuclear radiations to be measured and the background noise do not reach the dose detector 1 located in the radiation shielded area surrounded by a radiation shield material such as a lead plate, the counters 40 and 60 do not output any data. The white noise is detected so that the performances of the semiconductor radiation detector 10 are confirmed. Therefore, the misjudgment that the semiconductor radiation detector 10 is abnormal is prevented from causing. Therefore, it is possible to detect whether the semiconductor radiation detector 10 is working in the normal manner in the radiation shielded area as well as in the radiation exposed area.

(2) It is not necessary to provide a radiation source in the conventional device for radiating nuclear radiations. Accordingly, any specific process for detecting the deterioration of the semiconductor radiation detector 10 becomes unnecessary, and the maintenance of the semiconductor radiation detector 10 becomes very easy.

(3) Since the structure of the dose detector 1 according to the invention becomes simple, the manufacturing costs thereof are reduced and the reliability thereof is improved.

(4) By forming the data processor 70 of an apparatus such as an MPU and a CPU that executes software, the detection process and the checking process are conducted by programs. Therefore by improving the programs, the detection accuracy and the checking accuracy are further improved.

The disclosure of Japanese Patent Application No. 2004-138828, filed on May 7, 2004, is incorporated in the application.

While the invention has been explained with reference to the specific embodiments of the invention, the explanation is illustrative and the invention is limited only by the appended claims.

What is claimed is:

1. A dose detector comprising:
a semiconductor radiation detector for outputting a detection signal including noise according to detected nuclear radiations;
a first pulse height discriminator for discriminating a first signal with a voltages greater than a predetermined reference detection wave height voltage from the detection signal outputted from the semiconductor radiation detector to remove the noise contained in the detection signal, said first pulse height discriminator outputting a first pulse signal after the noise is removed;
a dose counter for counting the first pulse signal from the first pulse height discriminator to output dose count data;
a second pulse height discriminator for discriminating a second signal with a voltage greater than a predetermined reference checking wave height voltage from the detection signal outputted from the semiconductor radiation detector, said second pulse height discriminator outputting a second pulse signal including a part of the noise;
a check counter for counting the second pulse signal from the second pulse height discriminator to output check count data; and
a data processor for receiving the dose count data from the dose counter and the check count data from the check counter, said data processor including a judging unit for judging that the semiconductor radiation detector is normal when the dose count data is smaller than predetermined dose boundary data and the check count data is larger than predetermined lower limit checking data.

2. A dose detector according to claim 1, wherein said semiconductor radiation detector outputs the detection signal including white noise when the semiconductor radiation detector is used in a radiation shielded area, and said judging unit judges that the semiconductor radiation detector is outputting the white noise in the radiation shielded area when the dose count data is smaller than the dose boundary data and the check count data is larger than the lower limit checking data and that the semiconductor radiation detector is normal.

3. A dose detector according to claim 1, further comprising a temperature compensator connected to the data processor for measuring an environmental temperature and outputting temperature data, and a data generating unit for increasing the lower limit checking data and the upper limit checking data when the environmental temperature is higher than a specific temperature to generate new lower limit checking data and new upper limit checking data.

4. A dose detector according to claim 1, wherein said data processor operates the judging unit at a predetermined interval.

5. A dosimeter comprising the dose detector according to claim 1 for judging whether the semiconductor radiation detector is deteriorated.

6. A dose detector comprising:
a semiconductor radiation detector for outputting a detection signal including noise according to detected nuclear radiations;
a first pulse height discriminator for discriminating a first signal with a voltages greater than a predetermined reference detection wave height voltage from the detection signal outputted from the semiconductor radiation detector to remove the noise contained in the detection signal, said first pulse height discriminator outputting a first pulse signal after the noise is removed;
a dose counter for counting the first pulse signal from the first pulse height discriminator to output dose count data;
a second pulse height discriminator for discriminating a second signal with a voltage greater than a predetermined reference checking wave height voltage from the detection signal outputted from the semiconductor radiation detector, said second pulse height discriminator outputting a second pulse signal including a part of the noise;
a check counter for counting the second pulse signal from the second pulse height discriminator to output check count data; and
a data processor for receiving the dose count data from the dose counter and the check count data from the check counter, said data processor including a subtracting unit for subtracting the dose count data from the check count data to obtain difference data, and a judging unit for judging that the semiconductor radiation detector is abnormal when the difference data is smaller than predetermined lower limit checking data or the difference data is larger than predetermined upper limit checking data.

7. A dose detector according to claim 6, wherein said semiconductor radiation detector outputs the detection signal including background noise when the semiconductor radiation detector is used in a radiation exposed area, and said data processor further includes a determining unit for determining whether the dose count data is larger than predetermined dose boundary data so that the subtracting unit obtains the difference data when the dose count data is larger than the predetermined dose boundary data, said judging unit judging that the semiconductor radiation detector is abnormal for outputting the background noise smaller than a specific level when the difference data is smaller than the lower limit checking data, and judging that the semiconductor radiation detector is abnormal for outputting the background noise greater than a specific level when the difference data is greater than the upper limit checking data.

8. A dose detector according to claim 6, wherein said semiconductor radiation detector outputs the detection signal including white noise when the semiconductor radiation detector is used in a radiation shielded area, and said data processor further includes a determining unit for determining whether the dose count data is smaller than the predetermined dose boundary data so that the subtracting unit obtains the difference data when the dose count data is smaller than the predetermined dose boundary data, said judging unit judging that the semiconductor radiation detector is abnormal for outputting the white noise smaller than a specific level when the difference data is smaller than the lower limit checking data, and judging that the semiconductor radiation detector is abnormal for outputting the white noise greater than a specific level when the difference data is greater than the upper limit checking data.

9. A dose detector according to claim 6, further comprising a temperature compensator connected to the data processor for measuring an environmental temperature and outputting temperature data, and a data generating unit for increasing the lower limit checking data and the upper limit checking data when the environmental temperature is higher than a specific temperature to generate new lower limit checking data and new upper limit checking data.

10. A dose detector according to claim 6, wherein said data processor operates the judging unit at a predetermined interval.

11. A dosimeter comprising the dose detector according to claim 6 for judging whether the semiconductor radiation detector is deteriorated.

\* \* \* \* \*

UNITED STATES PATENT AND TRADEMARK OFFICE
CERTIFICATE OF CORRECTION

PATENT NO. : 7,217,930 B2 Page 1 of 1
APPLICATION NO. : 11/107859
DATED : May 15, 2007
INVENTOR(S) : Hironobu Kobayashi et al.

It is certified that error appears in the above-identified patent and that said Letters Patent is hereby corrected as shown below:

Change column 1, line 8, "a radiation; dose" to -- a radiation dose --,

Column 1, line 12, "and, displays" to -- and displays --,

Column 5, line 51, "includes, the" to -- includes the --,

Column 8, line 38, "larger than," to -- larger than --,

Column 9, line 31, "and, then, ; judges" to -- and, then, judges --, and

Column 10, line 61, "(e.g. 1000)" to -- (e.g. 1000). --.

Signed and Sealed this

Seventh Day of August, 2007

JON W. DUDAS
*Director of the United States Patent and Trademark Office*